F. A. HART.
COMBINED TYPE WRITING AND COMPUTING MACHINE.
APPLICATION FILED JULY 14, 1915.
1,296,953.
Patented Mar. 11, 1919.
3 SHEETS—SHEET 1.
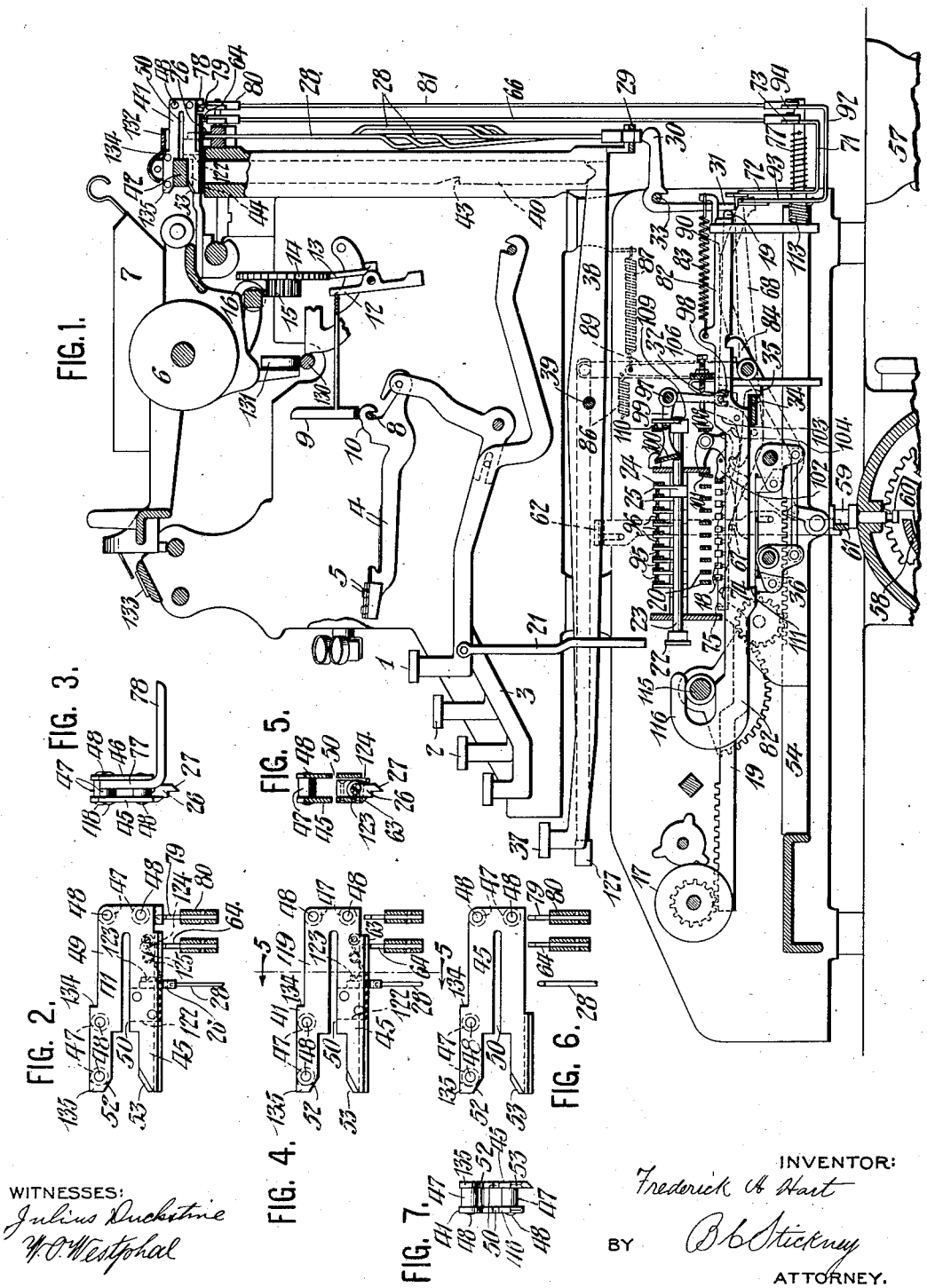
WITNESSES:
INVENTOR:
Frederick A. Hart
BY
ATTORNEY.

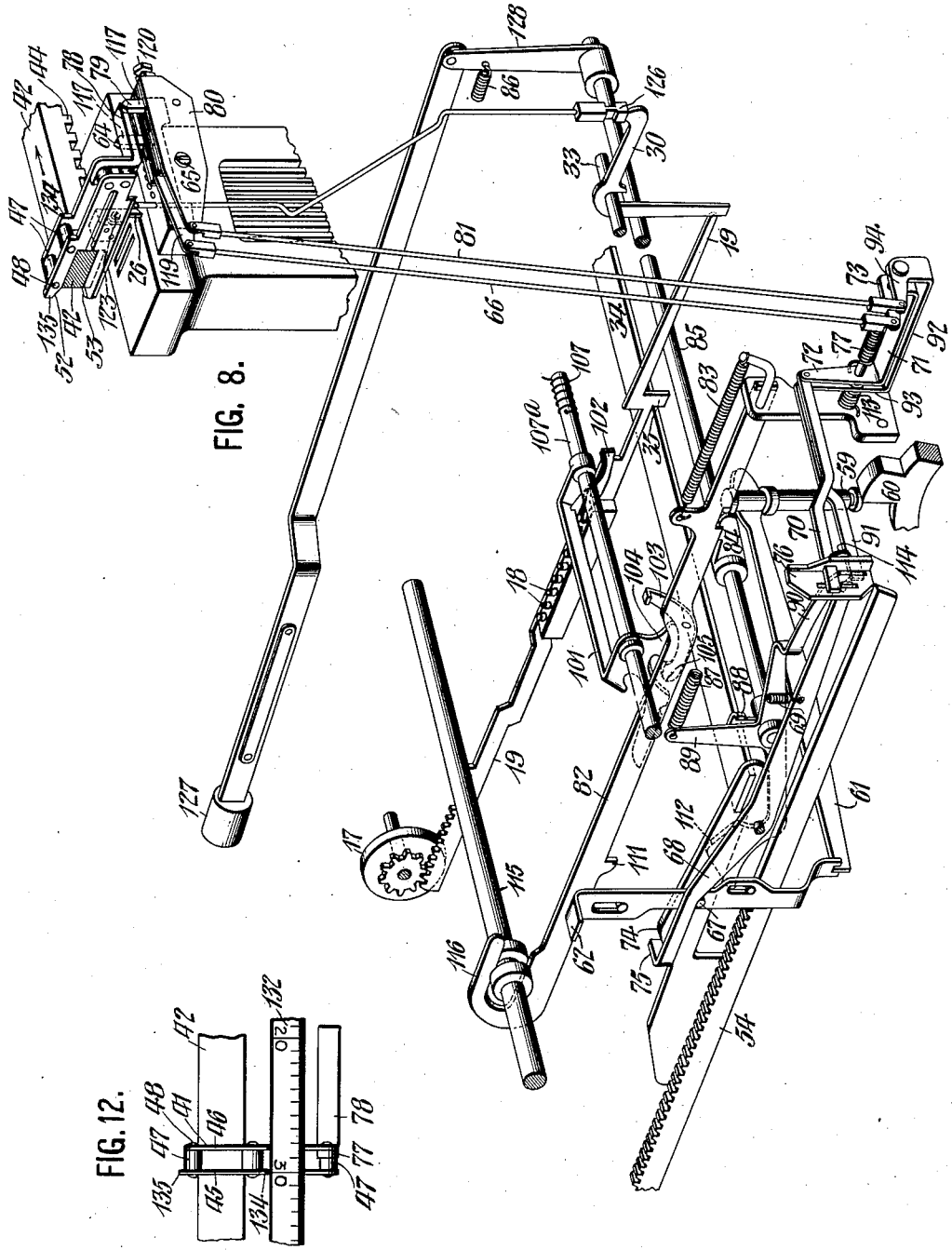

F. A. HART.
COMBINED TYPE WRITING AND COMPUTING MACHINE.
APPLICATION FILED JULY 14, 1915.
1,296,953.
Patented Mar. 11, 1919.
3 SHEETS—SHEET 3.
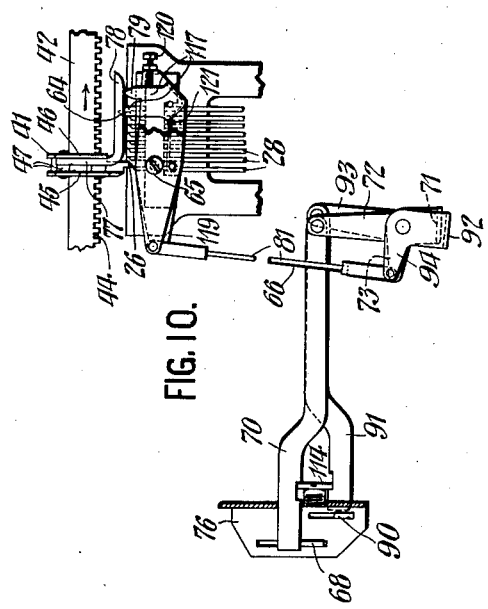
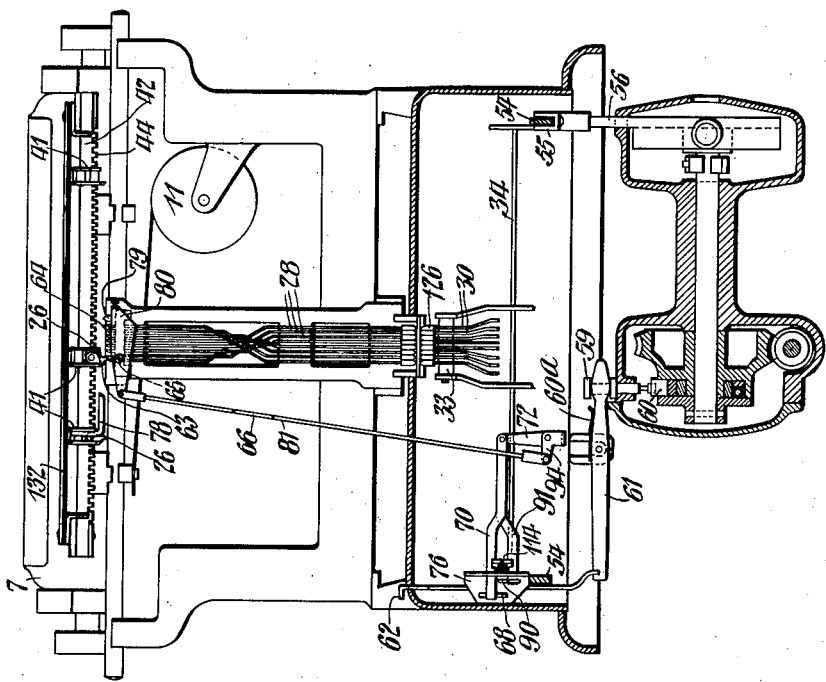
WITNESSES:
Julius Duchitine
N. O. Westphal
INVENTOR:
Frederick A. Hart
BY B. C. Stickney
ATTORNEY.

UNITED STATES PATENT OFFICE.

FREDERICK A. HART, OF NEWARK, NEW JERSEY, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,296,953.  Specification of Letters Patent.  Patented Mar. 11, 1919.

Application filed July 14, 1915. Serial No. 39,751.

*To all whom it may concern:*

Be it known that I, FREDERICK A. HART, a citizen of the United States, residing in Newark, in the county of Essex and State of New Jersey, have invented certain new and useful Improvements in Combined Type-Writing and Computing Machines, of which the following is a specification.

One object of the present invention is to provide improved column-selecting means suitable for use in writing machines, especially machines of the type known as combined typewriting and computing machines.

In such machines it is frequently desirable to select columns for different purposes, as, for instance, in a combined typewriting and computing machine, certain columns may be automatically selected to serve for adding purposes, and others may be automatically selected to serve for subtracting purposes, while others may be used for neither adding nor subtracting. It is found that in machines hitherto in use, the operatives, who are ordinarily far from being expert mechanics, are extremely likely to make errors resulting from the wrong selection of columns, or the selection of a column which may be in the right place, but of which the selecting mechanism is automatically connected to perform the wrong function.

In typewriting machines, tabulating stops are well known, and such stops are frequently used in combined typewriting and computing machines. In one advantageous form of the present invention, the tabulating stops are utilized both as denomination-selecting means, and for the purpose of determining whether the machine shall be automatically set to add or subtract in the columns in which they are effective. Each stop thus constitutes a composite tappet. Where it is not desired to use the column stops for denomination selectors; said column stops may, nevertheless, be provided with devices which determine whether said stops shall selectively cause addition or subtraction. In order to provide either the simple tabulating or the denomination-selecting type of stops, with as many mnemonic safety reminders as possible, it has been found convenient in the present invention to color the stops, so that they will be distinguishable at a glance, even by those who do not understand the mechanics of the stops. For this purpose, it is found convenient in the present invention to have the stops which serve for addition white or nickel-plated, whereas those which serve for subtraction may be black, and those which serve for tabulating purposes only, may be red or copper-plated. In order to further safeguard the operative from making mistakes, it is found convenient to form the stops or denomination-selecting blocks in such a way that they cannot be incorrectly placed on the rack-bar on which they are adjustably mounted.

Other features and advantages will hereinafter appear.

In the accompanying drawings,

Figure 1 is a sectional side view of an Underwood-Hanson combined typewriting and computing machine, showing my invention as applied thereto, the showing being principally in section and largely diagrammatic.

Fig. 2 is a side view of a subtraction stop.

Fig. 3 is a rear view of the same.

Fig. 4 is a side view of an adding stop.

Fig. 5 is a rear sectional view on line 5—5 of Fig. 4.

Fig. 6 is a side view of a neutral stop.

Fig. 7 is a front view of the same.

Fig. 8 is a skeleton perspective view showing a decimal tabulating stop just beginning to set the machine to subtraction.

Fig. 9 is a rear view of the parts seen in Fig. 1, when the carriage is entering an adding zone.

Fig. 10 is a rear view of some of the parts seen in Fig. 8, when the machine is starting to subtract.

Fig. 11 is a view similar to Fig. 10, but showing the machine at the moment the carriage passes out of a subtraction zone.

Fig. 12 is a plan view showing a subtraction stop in place, and its relationship to the scale plate by which it is located.

In the usual Underwood typewriting machine, numeral keys 1 and alphabet keys 2 depress key levers 3 to swing type-bars 4 upwardly and rearwardly, so that types 5 thereon print against the front side of a revoluble platen 6, in the usual traveling carriage 7. The type-bars 4 for this purpose are journaled on the usual segment ring 8, and as they approach the platen, each type-bar 4 actuates a universal bar 9 by means of a heel 10, for the purpose of causing the typewriter carriage to be drawn along one step by means of its usual spring-barrel 11. To cause this step-by-step feeding, the universal bar 9 actuates the usual dogs 12 and 13, which alternately engage the usual escapement wheel 14, said escapement wheel connected to the usual pinion 15, meshing with the usual rack 16, pivotally connected to the typewriter carriage. As the typewriter carriage moves along in the adding zone, the numeral keys set up numbers in a temporary register in one denomination after another as said numbers are printed, and said registered numbers are later carried into the usual computing wheels 17.

To accomplish this result, the numbers are temporarily registered in pins 18 on rack-bars 19, there being one rack-bar in each denomination (viz., each wheel 17) in which computing is done, and a separate digit pin on each rack-bar for each digit. To enable numbers to be registered, said pins are depressed,—one pin on each rack-bar. For this purpose the rack-bars are moved *seriatim* one at a time to bring their pins from the normal ineffective position, seen in Fig. 1, to a position where they may be depressed or set by means of pin-setting bars 20. When any numeral key 1 is depressed, it actuates its pin-setting bar 20, and said pin-setting bar sets its pin 18 on the rack-bar 19 which has been moved to bring its pins to pin-setting position. To set the pins, each numeral key 1 is provided with a pendant 21, which, in descending, strikes the usual crank arm 22 on the usual rock shaft 23, so that each numeral key, through its pendant, will rock its rock shaft 23 and thereby depress its pin-setting bar 20, each pin-setting bar for this purpose forming part of the usual linkage 24, said linkage being operated by a rock arm 25 fast on its rock shaft 23. The rack-bars 19, as stated above, normally occupy the position seen in Fig. 1. To bring the pins to pin-setting position, the rack-bars 19 are moved forward individually to a small extent, this being permitted by the usual lost motion, and this moving forward being effected by the typewriter carriage. To accomplish this, there is mounted on the typewriter carriage a tappet 26, which includes the usual cam face 27, said face, as the carriage travels along, being adapted to engage the upper ends of denominational rods 28 and slightly move said rods downwardly.

The general construction is similar to that shown in the co-pending application of Olmsted, 691,828, filed April 19, 1912, (now Patent No. 1,224,314, dated May 1, 1917), wherein the rods 28 are crossed so as to provide a transposing device to enable the carriage, as it travels toward the left, to move the rack-bars 19, beginning with the left-hand one. The denominational bars 28 are guided near their lower ends in a comb plate 29 and rest on the rear ends of forwardly extending bell-cranks 30, said bell-cranks each bearing at their lower forward end 31 against the rear ends of their own rack-bars 19. The rack-bars 19 are normally held in their rearward positions by means of the usual springs 32.

The connections described above are such that the tappet 26 in the adding zone depresses one after another the denominational rods 28, and these rods move the rack-bars 19 one at a time forwardly just enough to bring the proper pins 18 under the pin-setting bars 20. The connections between the rest of the mechanism and the bail 33 on which the bell-cranks 30 are journaled, may be identical with those shown in said co-pending application 691,828, but are omitted from the present drawing for the sake of clearness, said connections including, among other things, a connection to the platen-shift mechanism. When a number has been completely set up on the rack-bars 19, the number is carried into the computing wheels 17 by means of the usual general operator, which includes a cross bar 34. Said cross bar underlies the rack-bars 19 and, as it comes forward, strikes the projecting pins and through them drives the rack-bars 19 each to an extent dependent upon the pin depressed thereon, and thereby turns its computing wheel 17 to a corresponding extent. On the return stroke of the general operator, the rack-bars 19 are returned to their normal position by means of the usual lugs 35, which are struck by said cross bar of the general operator. At the same time, the pins 18 are restored to their usual normal positions by means of the usual pin-restoring plate 36.

In order to rapidly position the typewriter carriage in and at the computing zone, the machine may be provided with the usual Underwood decimal tabulating mechanism, which includes keys 37 mounted on the front ends of key levers 38, which are pivoted intermediate their ends at 39, and of which each is connected to raise its plunger counterstop 40 into the path of the column stops 41 mounted on the rack-bar 42, said rack-bar forming part of the usual Underwood typewriter carriage 7. To position the carriage, a stop and counter-stop arrest the carriage after being released by the usual carriage-release devices, not shown herein, but operated by the usual heels 43 cut into the counter-stops 40.

In the present invention, as herein illustrated, the rack-bar 42 is shown as having only a single set of teeth 44 thereon, said teeth being on the under side, and each column stop is herein shown as provided with two spaced side walls 45 and 46, which are adapted to engage said teeth and comprise openings by which they engage the rack-bar so as to overlie the stop bar 42. These side walls are spaced so as to embrace two or more consecutive teeth 44, so as to give a solid wide base for the stop, while the teeth 44 with which they coöperate are set at letter-space intervals. The side walls 45 and 46 are kept spaced apart from each other by spacing sleeves 47, said sleeves surrounding rivets 48 by which the side walls are joined. In the construction herein shown, two of the rivets 48 are placed in the portions of the walls which overlie the rack-bar 42, and these rivets and their spacing members 47 are located sufficiently near the inside edge of said walls to prevent said stop from being inserted upside down on the rack-bar, this prevention resulting from the fact that if it is attempted to insert a stop upside down, one of its spacing members 47 will strike the ends of the rack teeth 44, and thus prevent the stop from being inserted. Two of the rivets and spacing members 48 and 47 are placed at the opposite outer end of the stop, thus giving firmness to the structure. Said outer end is formed as a relatively long continuation 49 of the remainder of the stop, said continuation being slotted at 50, so that said slot is a continuation of the opening by which the stop embraces the rack-bar 42, this slot giving the parts a slight springiness to enable the stop to accommodate itself to slight variations in the size of the rack-bar 42, even though it fits all bars 42 tightly enough not to jar off in operation.

The parts of the walls 45 and 46 which embrace the rack-bar 42 are largely identical in form, but the right-hand wall 45 of the stop (as viewed by the operative when sitting at the machine) is extended downward to coöperate with the counter-stop 40 described above, whereas the wall 46 is too shallow to reach the counter-stop even when the said counter-stop is elevated. The stop is cut away at the corners 52 and 53 which would ordinarily strike the rack-bar as the stop is inserted, and the lower corner 53 of each side is beveled on the slope of the cut-away portion in order to enable it to enter the rack-bar 42 easily, even if not quite accurately positioned. When one of these stops, therefore, is inserted on the rack-bar 42, and is used to arrest the typewriter carriage, it will be observed that the side 46 which does not arrest the carriage passes over the counter-stop 40 idly, and the carriage is arrested by the other side 45 of the stop when that one reaches the counter-stop. Both the counter-stop and the arresting side 45 of the column stop are beveled in the manner customary in Underwood typewriting machines, and for the same purpose.

The stop thus described is shown in Figs. 6 and 7. This column stop is particularly well adapted to be used for operating the ordinary automatic devices for driving the general operator of the Underwood-Hanson machine. One form of said devices is shown in the co-pending application of Thornton, 769,132, filed May 22, 1913, wherein the side bar 54 of the general operator is provided with the usual yoke 55, through which said operator is adapted to be driven by the reciprocating arm 56 driven by the motor 57.

One of the means for driving the general operator from the motor is shown in said application 769,132, wherein the electric connections of the motor and the clutch 58 by which the motor drives the mechanism, are shown as under the control of a starting pin 59 which normally is held in the path of a lug 60 by a spring 60ª, said lug forming part of the clutch and electric terminal mechanism. Whenever the pin 59 is lifted, the lug 60 jumps forward and closes an electric current through the motor, and at the same time closes the clutch 58 and causes the motor to reciprocate the general operator. This pin 59 is raised to effect this by means of a lever 61 which always engages said pin by a notch in its side, and said lever may be manually operated by means of the usual key 62, if desired. The stop shown in Fig. 4, however, is enabled to lift the pin 59, and for this purpose said stop is provided with a projection 63 extending downwardly from its wall 45, which projection may form an extension of the part of the stop which coöperates with the counter-stop 40, if the stop is also used as a column stop. This projection, when the carriage moves out of the adding zone, rides over and cams downward a starting dog 64 on a lever pivoted at 65 and connected by a downwardly extending draw link 66 to the bottom of the machine, where it is connected to parts which operate the pin 59, substantially in the manner shown in said application 769,132. The connections by which the draw link 66 starts the motor include a pin 67 on the starting key 62, and a lever 68 which overlies this pin and extends rearwardly, normally tending to depress the starting key 62 because of a spring 69 which tends to draw the rear end of said lever upward. Normally the lever 68 is restrained against being thus moved by its spring 69, and for this purpose there lies above the rear end of said lever a bar 70, which is connected to the starting dog 64 through the draw link 66, said connections including a bail 71 having an arm 72 to which the holding bar 70 is pivoted, and a second arm 73, to which the draw link 66 is pivoted.

Whenever the typewriter carriage moves out of the adding zone, the extension 63 of the stop 41 draws the draw-link 66 upward, thereby withdrawing the holding bar 70 from the lever 68, and permits the spring 69 to force the starting key 62 downward, thus starting the motor to drive the general operator. The motor then reciprocates the general operator through a forward and return movement, as outlined above. During the early part of the forward movement, a cam 74 fast on said general operator rides under a tappet 75 extending from the lever 68, and raises said lever up again, thus permitting the starting pin 59 to fall back into place in front of the lug 60 where it will arrest the general operator at the completion of one revolution of the clutch 58. The raising of the lever 68 at its forward end puts said lever again under the control of the holding bar 70, this resulting from the fact that the guide plate 76 in which the lever 68 moves, restricts said lever to such a small motion that its end can never slip clear of the end of the holding bar 70. When the lever 68, therefore, has its rear end low enough, the holding bar 70 will be swung back to effective position over said lever by the spring 77 coiled around the shaft on which the bail 71 is journaled.

In addition to adding, the present machine is adapted to subtract, which may be brought about by a cam bar extension 78 of the starting stop 41, such an extension being shown in Fig. 3. This extension is formed as a bar extending up between the plates 45 and 46. The rear rivets pass through the bar 78 and the spacing members 48 and 47 engage it, so that it forms a part of the body of the stop, the lower end of said bar being bent out horizontally and beveled at the ends so as to extend over just the width of an adding column. This cam bar extension 78, as the carriage rides along, strikes a subtraction dog 79 on a lever 80, which lever is pivoted at 65, so that when said lever is cammed down by the cam bar extension 78, it draws upwardly a draw link 81 to cause the mechanism to subtract. This subtraction mechanism may be substantially identical with that shown in application 769,132, *supra*, which is of the complementary subtraction type, namely, one in which the computing wheels 17 always turn in the same direction,—the subtraction being brought about by altering the pin-setting connections, so that each key, instead of setting up a pin corresponding to the number it prints, sets up a pin representing a complementary digit. The subtraction mechanism comprises the principal parts shown in co-pending application of Minton, 797,714 filed October 28, 1913.
Said mechanism also automatically takes care of certain other advantageous and necessary features, as, for example, the setting of the "9" pins to represent zero in every column in which no other digit is printed, and also the automatic adding of "1" in the units column. To accomplish these results, the draw link 81 releases a subtraction bar 82 which automatically makes the necessary shifts and connections to effect complementary subtraction. This subtraction bar 82 normally tends to be drawn into subtraction position by a spring 83, but is restrained from being so drawn by a dog 84 which is under the control of the draw link 81. To bring about this control, said dog 84 is fast on a shaft 85 which normally tends to be swung by a spring 86 into effective position, but which spring is overcome by a much stronger spring 87 whenever the subtraction dog 79 actuates the draw link 81. To bring about this result, there is provided, fast on the shaft 85, an arm 88 against which an arm 89 is pressed by the spring 87, said arm 89 being part of a bell-crank journaled on the shaft 85, of which bell-crank the rearwardly extending arm 90 overlies a holding bar 91, said holding bar connected to the draw link 81 by means of the bail 92, said bail having one arm 93 pivoted to the holding bar 91, and an arm 94 pivoted to the draw link 81.

Whenever the typewriter carriage carries the subtraction cam extension 78 along until it actuates the subtraction dog 79, the link 81 is drawn upward thereby, withdrawing the holding bar 91 and permitting the spring 87 to withdraw the dog 84, so that the subtraction bar 82 will spring to subtraction under the influence of its spring 83. In springing to subtraction, the subtraction bar 82 shifts the rock shafts 23 forwardly, so that the rock arms 25 thereon are disengaged from the addition wrists 95 by which they actuate the pin-setting bars 20, and similar subtraction rock arms also fast on the rock shafts 23 engage subtraction wrists 96, said subtraction wrists and subtraction rock arms located to operate pin-setting linkages complementary to the ones previously engaged by the rock arms 25. This is brought about by means of a rock shaft 97 having one arm embracing a pin 98 on the subtraction bar 82, said shaft having another arm 99 extending forwardly, this last-named arm 99 pivotally and loosely connected to the rearward extension of a bar 100 universal to said rock shafts 23 and engaging notches therein, but pivoted at its upper end, so that when the subtraction bar 82 is drawn forward, said universal bar 100 will rock and shift forwardly all the rock shafts 23 to cause the shifting of the subtraction rock arms 25 into position to engage the subtraction wrists, as described above.

At the same time, all the "9" pins 18 are set by a universal pin-setting bar 101, which engages levers 102 by which the "9" pins may be either set or unset, for subtraction purposes. This setting of the "9" pins is brought about by a bell-crank lever 103 pivoted on the subtraction bar 82, said bell-crank lever having a hook which engages a rearward extension 104 of the universal bar 101, so that as the subtraction bar 82 moves rearwardly it rocks the universal bar 101 downwardly momentarily, just long enough to set the "9" pins. The arm 105 of the bell-crank 103 which engages the hook 104, is then released from the hook 104 before the subtraction bar 82 finishes its movement. This releases the universal bar 101 from the subtraction bar 82, so that the further manipulation of the "9" pins will not be interfered with by the universal bar 101. This swinging of the bell-crank 103 is obtained by causing the upper part thereof to strike a set screw 106, which is fast to the frame of the machine and is adapted to swing the arm 105 clear of the extension 104 of the universal bar 101. The universal bar 101 is returned to its normal position by means of a spring 107 coiled about the shaft 107$^a$ on which it is fast.

If, e. g., the "9" typewriter key is depressed while in the subtraction column, said key will not only print "9", but it will also restore to its normally ineffective position the "9" pin on the rack-bar 19 which is for the moment effective. The connections for doing this include a "9"-pin-restoring bar 108, which is operated by the "9" key rock shaft when in subtracting position. This restoring bar 108 strikes the rearward extension of the lever 102 of the "9" pin which is on the effective rack-bar 19, and so raises the front end of said lever, and with it its "9" pin. This "9"-pin-restoring bar 108 forms part of a linkage like the linkages 24, and like them operated by a rock arm 109, said rock arm, however, being normally ineffective, and only engaging the wrist 110 of its linkage when subtraction is being done, viz., when the universal bar 100 holds the rock shafts 23 to their subtraction connections.

After the digits composing a number have also been written and set up, and the number is carried into the computing wheels in the manner above described, the subtraction bar 82 is restored to adding position. For this purpose the subtraction bar is provided with a lug 111 which is adapted to be struck by the cross bar 34 of the general operator, as said operator reaches the limit of its forward stroke. This moves the subtraction bar forward, tensioning the spring 83 and permitting the dog 84 to be swung up to its effective position to hold the subtraction bar, this being done by the spring 86, described above.

During the forward stroke of the general operator, its cross bar 34 strikes a double cam-shaped forward extension 112 of the lever 90, causing its rear end to be raised to effective position above its holding bar 91, thus permitting the spring 113 to swing the holding bar 91 back to its effective position to hold the lever 90, said spring coiled about the shaft on which its bail 93 is journaled. This has the effect of taking the tension of the spring 87 off the rock shaft 85 before the subtraction bar is drawn back to its ineffective position, and thus gives free rein to the spring 86 which restores the dog 84, as described above.

The holding bar 91 is enabled to return to its effective position because said bar is of such a width, and the guiding plate of the lever 90 has a slot of such a height that the lever 90 can never slip past the end of the holding bar 91 and lock said bar against returning. At the same time, the universal bar 101 is positively returned to its normal position if it has not so been returned by its spring 107, this being brought about by a forward extension of the hook 104, which extension overlies the cross bar 34 of the general operator in the early part of its travel, and is forcibly cammed up by said cross bar 34 if struck thereby.

The holding bars 70 and 91 have their throw limited by a screw 114 threaded into a wing of the guide plate 76, said screw having an enlarged head which engages notches cut in said bars, the notches being of proper length to limit the throw of said bars. The subtraction bar 82 has its forward end guided between collars on the usual transverse manual drive shaft 115 of the computing mechanism, said forward end being provided with an elongated open slot 116 for the purpose.

The subtraction dog and the computation-starting dog are both of them so constructed that the carriage will be effective on them only during its forward feeding movement, and for this purpose are formed as pivoted bodies 117 journaled on their levers 80, 119, said levers being each provided with set screws 120 against which said dogs abut when the carriage is fed forwardly, but allowing said dogs to swing idly in the opposite direction, and being also provided each with a wire spring 121 which holds its dog in effective position, but is weak enough to yield on the return stroke of the carriage.

If it be desired to utilize the stops as denomination-selecting devices, the adding and subtracting dogs may be provided with the tappets 26, above referred to, said tappets being pivoted on blocks 122 lying within one arm of the dog and riveted thereto, said tappets being of the usual form, having cam faces 27 which are adapted to cam downwardly the denominational bars 28, which for this purpose have correspondingly cammed faces. The blocks 122 are advantageously fast to only one wall of the stop. During the forward feed of the carriage, any dog 27 lies with its flat face against the right-hand wall of its stop so that its cam face is held in effective position; but on the return stroke of the carriage, said tappet is able to swing on its pivot to an ineffective position, its left-hand side (as viewed by the operative when sitting before the machine) being for this purpose rounded off sufficiently to allow for this action. The tappet is held to its block 122 by a screw 123 forming the pivot on which it swings, and a spring 124 constantly urges the tappet to the position in which it will be effective on the forward stroke of the carriage, said spring coiled about a couple of rivets 125 within the body of the slot. The throw of the denominational members 28, both under the downward forcing of their tappets and upward, may be limited by elongated notches cut in the sides of the enlarged lower ends 126 of said members, said ends slidably fitting in the comb plate 29.

The machine is also provided with a hand subtraction key 127 which is pivotally attached to the upper end of the rock arm 128, said rock arm being fast on the shaft 85, which carries the controlling dog 84. The spring 86, which holds said controlling dog in effective position, is anchored to the side of the machine and draws on said arm 128.

The machine is also provided with the usual bichrome ribbon shift (not shown) which is connected to be operated by the subtraction key 127 in the manner shown in the co-pending application of Richard M. Becker, Serial Number 697,393, filed May 15, 1912, (now Patent No. 1,243,669, dated October 16, 1917).

The case-shift mechanism, which has been referred to above, is diagrammatically shown only by the usual rail 130 on which the wheel 131 of the platen-shift frame runs in the usual manner.

The machine is provided with a scale plate 132, suitably mounted on the carriage adjacent the column stop rack-bar 42, for the purpose of enabling the operative to insert the stops 41 at any required denomination without going to the trouble of counting up letter-spaces, the notations on said scale corresponding to the notations on the ordinary scale 133 at the front of the typewriter carriage.

This scale plate, as seen in Fig. 1, is just about on a level with the upper shoulders 134 of the various stops. The scale is advantageously so mounted that said shoulders just catch in front of the scale when a stop is pushed all the way home, and thus the stops may be said to be semi-locked in place. The scale 132 and its mountings are limber enough so that the mere act of putting the finger under the scale to remove a stop will release said scale from the shoulders 134.

In order to visibly indicate to the operative which side of the stop is to be read in connection with the scale 132, the wall 45 of the stop by which the stop is arrested in tabulating, is prolonged at 135 beyond the rearmost rivet 48, thus forming sort of an indicator, while the other side 46 is rounded off nearly to the shape of the spacing member 47.

It will be noted from the subtraction stop shown in Fig. 12 that the bar 78 thereof is effective over nine letter-spaces; this being the number of letter-spaces covered by the register in the ordinary Hanson machine. With registers having a different capacity, correspondingly different subtraction bars 78 should be used.

The relationship of the starting and subtraction dogs 64 and 79 to the rest of the mechanism is such that the starting dog is effective in the letter-feed of the carriage, which takes place as a numeral key rises after writing a digit in the units column. The subtraction dog is so set with reference to the subtraction bar 78, that the machine goes to subtraction immediately the denomination-selector 27 enters the adding zone and becomes ineffective in the same space that the starting dog becomes effective.

Variations may be resorted to within the scope of the invention, and portions of the improvements may be used without others.

Having thus described my invention, I claim:

1. In a combined typewriting and computing machine, the combination with typewriter numeral keys and a traveling carriage, of a device in which numbers are temporarily registered as they are printed, a column stop rack bar for said carriage, column stops settable on said rack bar, means associated with said column stops for selecting the denominations in which the numbers shall be registered, and for determining whether they shall be added or subtracted, and a power device also under the control of said stops for causing the temporarily registered numbers to be permanently registered.

2. In a combined typewriting and computing machine, the combination with typewriter numeral keys and a traveling carriage, of a device in which numbers are temporarily registered as they are printed, a column-stop rack bar for said carriage, column-stops settable on said rack bar, and means associated with said column-stops for selecting one by one all the denominations in which the numbers shall be registered, and for determining whether they shall be added or subtracted.

3. In a combined typewriting and computing machine, the combination with typewriter numeral keys and a traveling carriage, of a device in which numbers are temporarily registered as they are printed, a column-stop rack bar for said carriage, a column-stop settable on said rack bar, and means associated with said column-stop for selecting one by one all the denominations in which the numbers shall be registered, and for causing subtraction to be performed.

4. In a combined typewriting and computing machine, in combination, addition and subtraction mechanism comprising denomination-selecting means, a typewriter carriage, and a compound stop settable along the run of said carriage for variably locating the zone of computation, and comprising means to coöperate with the denomination-selecting means to select all the denominations one by one, and also comprising means to cause subtraction to be performed in said zone.

5. In a combined typewriting and computing machine, in combination, adding and subtracting mechanism including denomination-selecting means, a typewriter carriage, a composite tappet settable along the run of said carriage for variably locating the zone of computation, and having thereon means for actuating the denomination-selecting means and means to determine whether addition or subtraction shall be performed in said zone.

6. In a combined typewriting and computing machine, in combination, adding and subtracting mechanism including denomination-selecting means, a typewriter carriage, a composite tappet settable along the run of said carriage for variably locating the zone of computation, and having thereon means for actuating the denomination-selecting means and means to cause subtraction to be performed in said zone.

7. In a combined typewriting and computing machine, in combination, adding and subtracting mechanism including denomination-selecting means, a typewriter carriage, a composite tappet settable along the run of said carriage for variably locating the zone of computation, and having thereon means for actuating the denomination-selecting means and a cam bar co-extensive with the width of an adding column, adapted to set the subtraction mechanism for operation.

8. In a combined typewriting and computing machine, motor-actuated addition and subtraction mechanism having denomination-selecting means, motor-tripping means, and means to determine whether addition or subtraction is to be performed in the computing zone, and a compound tabulator stop having parts adapted to coöperate with all of said means to control the same automatically.

9. The combination with a traveling carriage, of a bar on said carriage, computation-indexing mechanism, denomination-selecting means therefor, addition and subtraction means, and a compound tabulator stop on said bar constructed and arranged to coöperate with each of the aforesaid means so as to control the same.

10. In a combined typewriting and computing machine having a carriage with a rack bar thereon, denomination-selecting means, a motor-operated general operator, and subtraction mechanism, a tabulating mechanism for said carriage having a composite tabulator stop comprising two plates spaced apart so as to give suitable bearing engagement with said rack bar and having means to trip the motor-actuated general operator, a tripping cam bar for the subtraction mechanism extending parallel to said rack bar, and a pivoted tappet mounted between said bars so as to actuate the denomination-selecting means during the movement of the carriage in one direction.

11. In a combined typewriting and computing machine having a carriage with a rack bar thereon, denomination-selecting means, and subtraction mechanism, a tabulating mechanism for said carriage having a composite tabulator stop comprising two plates spaced apart so as to give suitable bearing engagement with said rack bar and having a tripping cam bar for the subtraction mechanism extending parallel to said rack bar, and a pivoted tappet mounted between said bars so as to actuate the denomination-selecting means during the movement of the carriage in one direction.

FREDERICK A. HART.

Witnesses:
W. O. WESTPHAL,
JULIUS DUCKSTINE.